(12) United States Patent
Xu et al.

(10) Patent No.: US 12,525,867 B2
(45) Date of Patent: Jan. 13, 2026

(54) SWITCH MODE POWER SUPPLY CONTROL CIRCUIT AND POWER SUPPLY CHIP

(71) Applicant: SHANGHAI XINLONG SEMICONDUCTOR TECHNOLOGY CO., LTD., Shanghai (CN)

(72) Inventors: Jinlong Xu, Shanghai (CN); Ruiping Li, Shanghai (CN)

(73) Assignee: SHANGHAI XINLONG SEMICONDUCTOR TECHNOLOGY CO., LTD., Shanghai (CN)

( * ) Notice: Subject to any disclaimer, the term of this patent is extended or adjusted under 35 U.S.C. 154(b) by 197 days.

(21) Appl. No.: 18/694,044

(22) PCT Filed: May 9, 2023

(86) PCT No.: PCT/CN2023/092891
§ 371 (c)(1),
(2) Date: Mar. 21, 2024

(87) PCT Pub. No.: WO2023/217104
PCT Pub. Date: Nov. 16, 2023

(65) Prior Publication Data
US 2024/0396428 A1 Nov. 28, 2024

(30) Foreign Application Priority Data
May 12, 2022 (CN) .......................... 202210511817.X

(51) Int. Cl.
*H02M 1/08* (2006.01)
*H02M 1/00* (2006.01)
*H02M 3/158* (2006.01)

(52) U.S. Cl.
CPC ............ *H02M 1/08* (2013.01); *H02M 1/0003* (2021.05); *H02M 3/158* (2013.01)

(58) Field of Classification Search
CPC ........ H02M 1/08; H02M 3/158; H02M 1/0003
See application file for complete search history.

(56) References Cited

U.S. PATENT DOCUMENTS 11,507,128 B1 * 11/2022 Sharma ............... H02M 1/0003
2011/0204867 A1   8/2011 Hane
(Continued)

FOREIGN PATENT DOCUMENTS

| CN | 101951149 A | 1/2011 |
|---|---|---|
| CN | 102751874 A | 10/2012 |

(Continued)

OTHER PUBLICATIONS

China National Intellectual Property Administration, International Search Report, Application No. PCT/CN2023/092891, mailed Jun. 21, 2023, 6 pages.

*Primary Examiner* — Alex Torres-Rivera
(74) *Attorney, Agent, or Firm* — Ziegler IP Law Group, LLC.

(57) ABSTRACT

An SMPS control circuit and a power chip are disclosed. The SMPS control circuit includes a signal conversion module configured to acquire an input voltage and output a reference signal. The reference signal increases as the input voltage increases at a rate decreasing as the input voltage increases. The reference signal is configured to turn on a power transistor and maintain it on for a period of time in inverse proportion to the reference signal. With this configuration, the SMPS control circuit operates in a COT mode combining, in a high-voltage range, advantages of both a complete COT mode and a mode with an on-time in inverse proportion to the input voltage, overcoming the problem with conventional power supply circuits of being configured with (Continued)

an on-time vs. input voltage functional relationship in a COT mode, which is suboptimal and problematic under some operating conditions.

11 Claims, 3 Drawing Sheets

(56) References Cited

U.S. PATENT DOCUMENTS

| | | | |
|---|---|---|---|
| 2021/0257920 A1 | 8/2021 | Cheng et al. | |
| 2023/0013594 A1* | 1/2023 | Kawano | H02M 1/0025 |

FOREIGN PATENT DOCUMENTS

| | | |
|---|---|---|
| CN | 103401420 A | 11/2013 |
| CN | 104253544 A | 12/2014 |
| CN | 104779793 A | 7/2015 |
| CN | 105099181 A | 11/2015 |
| CN | 105553263 A | 5/2016 |
| CN | 111478581 A | 7/2020 |
| CN | 113258771 A | 8/2021 |
| CN | 114629331 A | 6/2022 |

* cited by examiner

1

SWITCH MODE POWER SUPPLY CONTROL CIRCUIT AND POWER SUPPLY CHIP

TECHNICAL FIELD

The present invention relates the field of power chips and, in particular, to a switched-mode power supply (SMPS) control circuit and a power chip.

BACKGROUND

A switched-mode power supply (SMP) is often controlled in a pulse-width modulation (PWM), pulse-frequency modulation (PFM) or constant on-time (COT) mode. COT control features a constant on-time of the power transistor and an off-time under the control of another control circuit, which enable adjustments in the output voltage.

The COT mode has been used extensively due to its simple control circuit and ease of compensation.

The commonly so-called COT refers to a fixed on-time under given conditions with defined peripheral, input and output configurations, rather than necessary under all conditions.

In a buck topology with a completely fixed on-time (which does not vary with condition), the output frequency at the switch pin varies with the input voltage. Considering that the output voltage is fixed, the switching frequency is inversely proportional to the input voltage. From the point of view of practical applications, this is particularly unfavorable to applications with a wide voltage range, because the frequency will drop too low at high voltages, leading to high inductance being required.

There is another technique, in which the on-time is made inversely proportional to the input voltage, and the switching frequency is accordingly constant. This technique is disadvantageous in significant crossover losses at high voltages, which is unfavorable to system efficiency.

In short, the conventional power supply circuits are configured with on-time vs. input voltage functional relationships, which are suboptimal and problematic under some operating conditions.

SUMMARY OF THE INVENTION

It is an objective of the present invention to provide an SMPS control circuit and a power chip, which can overcome the problem with conventional power supply circuits of being configured with an on-time vs. input voltage functional relationship in a COT mode, which is suboptimal and problematic under some operating conditions.

To this end, the present invention provides an SMPS control circuit comprising a signal conversion module and an on-time realization module.

The signal conversion module is configured to acquire an input voltage and output a reference signal, which is a constant voltage signal when the input voltage is constant and increases as the input voltage increases at a rate decreasing as the input voltage increases when the input voltage is within an operating range.

The on-time realization module is based on the reference signal to output a control signal, which turns on the power transistor and maintains it on over a period of time in inverse proportion to the reference signal.

Optionally, when the input voltage is within the operating range, the reference signal and the input voltage may satisfy the following functional relationship:

$$S = a(\text{Ln}(b*\text{VIN}+c)+d),$$

where S represents the reference signal, VIN represents the input voltage, Ln represents a natural logarithm operation, and a, b, c and d are constant coefficients determined by electrical parameters of components of the SMPS control circuit.

Optionally, the signal conversion module may comprise a first conversion sub-module, a second conversion sub-module and a third conversion sub-module, which are connected in sequence, the first conversion sub-module configured to acquire the input voltage and convert it into a first intermediate signal in direct proportion to the input voltage, the second conversion sub-module configured to acquire the first intermediate signal and convert it into second intermediate signal, which increases as the first intermediate signal increases at a rate decreasing as the first intermediate signal increases, the third conversion sub-module configured to acquire the second intermediate signal and produce the reference signal by amplifying and level-shifting the second intermediate signal.

Optionally, the second conversion sub-module may comprise a first voltage signal node and a second voltage signal node, wherein a voltage at the first voltage signal node varies at the same rate with temperature as a voltage at the second voltage signal node, and wherein the second intermediate signal is obtained by subtracting the voltage at the second voltage signal node from the voltage at the first voltage signal node.

Optionally, the first conversion sub-module may comprise a first resistor, a second resistor, a third resistor, a first operational amplifier, a first transistor, a second transistor and a third transistor, a first terminal of the first resistor being grounded, a first terminal of the second resistor connected to a second terminal of the first resistor, a second terminal of the second resistor configured to acquire the input voltage, a non-converting terminal of the first operational amplifier connected to the second terminal of the first resistor, a positive power supply terminal of the first operational amplifier connected to a power supply, a negative power supply terminal of the first operational amplifier being grounded, the first transistor implemented as an NPN transistor, a base of the first transistor connected to an output terminal of the first operational amplifier, an emitter of the first transistor connected to a converting terminal of the first operational amplifier, the emitter of the first transistor also grounded through the third resistor, the second transistor implemented as a PNP transistor, an emitter of the second transistor connected to the power supply, a collector of the second transistor connected to a collector of the first transistor, a base of the second transistor connected to its own collector, the third transistor implemented as a PNP transistor, an emitter of the third transistor connected to the power supply, a base of the third transistor connected to the base of the second transistor, a collector of the third transistor configured to output the first intermediate signal which is a current signal.

Optionally, the second conversion sub-module may comprise a reference current source, a fourth transistor, a fifth transistor, a sixth transistor, a seventh transistor and an eighth transistor, the fourth transistor implemented as a PNP transistor, an emitter of the fourth transistor connected to a power supply, a base of the fourth transistor connected to its own collector, the collector of the fourth transistor connected to a positive terminal of the reference current source, a negative terminal of the reference current source being grounded, the fifth transistor implemented as a PNP transistor, an emitter of the fifth transistor connected to the power supply, a base of the fifth transistor connected to the base of the fourth transistor, a collector of the fifth transistor configured to acquire the first intermediate signal which is a current signal, the sixth transistor implemented as a PNP transistor, an emitter of the sixth transistor connected to the power supply, a base of the sixth transistor connected to the base of the fourth transistor, the seventh transistor implemented as an NPN transistor, a collector of the seventh transistor connected to the collector of the fifth transistor, the collector of the seventh transistor connected to its own base, an emitter of the seventh transistor configured to acquire a first reference voltage, the collector of the seventh transistor also configured to output a first voltage, the eighth transistor implemented as an NPN transistor, a collector of the eighth transistor connected to a collector of the sixth transistor, the collector of the eighth transistor connected to its own base, an emitter of the eighth transistor configured to acquire the first reference voltage, the collector of the eighth transistor also configured to output a second voltage, wherein the second intermediate signal is the difference between the first voltage and the second voltage.

Optionally, the third conversion sub-module may comprise a differential amplifier, a fourth resistor, a fifth resistor, a sixth resistor, a seventh resistor, an eighth resistor and a second operational amplifier, non-converting and converting terminals of the differential amplifier configured to cooperate with each other to acquire the second intermediate signal, a positive power supply terminal of the differential amplifier connected to a power supply, a negative power supply terminal of the differential amplifier being grounded, a first terminal of the fourth resistor connected to an output terminal of the differential amplifier, a second terminal of the fourth resistor connected to a non-converting terminal of the second operational amplifier, a first terminal of the fifth resistor connected to the second terminal of the fourth resistor, a second terminal of the fifth resistor configured to a second reference voltage, a first terminal of the sixth resistor connected to the second terminal of the fourth resistor, a second terminal of the sixth resistor being grounded, a first terminal of the seventh resistor connected to a converting terminal of the second operational amplifier, a second terminal of the seventh resistor being grounded, a first terminal of the eighth resistor connected to an output terminal of the second operational amplifier, a second terminal of the eighth resistor connected to the first terminal of the seventh resistor, a positive power supply terminal of the second operational amplifier connected to the power supply, a negative power supply terminal of the second operational amplifier being grounded, the output terminal of the second operational amplifier configured to output the reference signal.

Optionally, the fourth resistor, the fifth resistor and the sixth resistor may have equal resistance, and resistance of the parallel-connected seventh and eighth resistors may be equal to the resistance of the fourth resistor.

Optionally, the reference signal may be a voltage signal, wherein the on-time realization module comprises a voltage-to-current conversion sub-module, a capacitor, a discharge sub-module, a comparative voltage output sub-module and a power transistor driving sub-module, the voltage-to-current conversion sub-module configured to acquire the reference signal and convert it into a constant charge current in direct proportion to the reference signal, the charge current configured to charge the capacitor;

the discharge sub-module configured to acquire a discharge signal and discharge the capacitor so that a voltage across the capacitor drops to, and remains at, 0 V within a single on-period of the discharge signal, the discharge signal produced in response to turning-off of the power transistor, the single on-period of the discharge signal determined by an external configuration signal or input from an external circuit, the comparative voltage output sub-module configured to output a comparative voltage, the power transistor driving sub-module configured to compare the voltage across the capacitor with the comparative voltage within a single off-period of the discharge signal and turn on the power transistor if the voltage across the capacitor is lower than the comparative voltage, or turn off the power transistor if the voltage across the capacitor is higher than the comparative voltage, the power transistor driving sub-module also configured to turn off the power transistor within the single on-period of the discharge signal.

To the above end, the present invention also provides a power chip comprising the SMPS control circuit as defined above.

Compared with the prior art, the present invention provides an SMPS control circuit and a power chip. The SMPS control circuit includes a signal conversion module and an on-time realization module. The signal conversion module is configured to acquire an input voltage and output a reference signal, which increases as the input voltage increases at a rate decreasing as the input voltage increases. The on-time realization module is based on the reference signal to output a control signal, which turns on a power transistor and maintains it on for a period of time in inverse proportion to the reference signal. With this configuration, the SMPS control circuit operates in a COT mode combining, in a high-voltage range, advantages of both a complete COT mode and a mode with an on-time in inverse proportion to the input voltage, overcoming the problem with conventional power supply circuits of being configured with an on-time vs. input voltage functional relationship in a COT mode, which is suboptimal and problematic under some operating conditions.

BRIEF DESCRIPTION OF THE DRAWINGS

Those of ordinary skill in the art would appreciate that the accompanying drawings are provided to facilitate a better understanding of the present invention and do not limit the scope thereof in any sense, in which.

Figure 1:
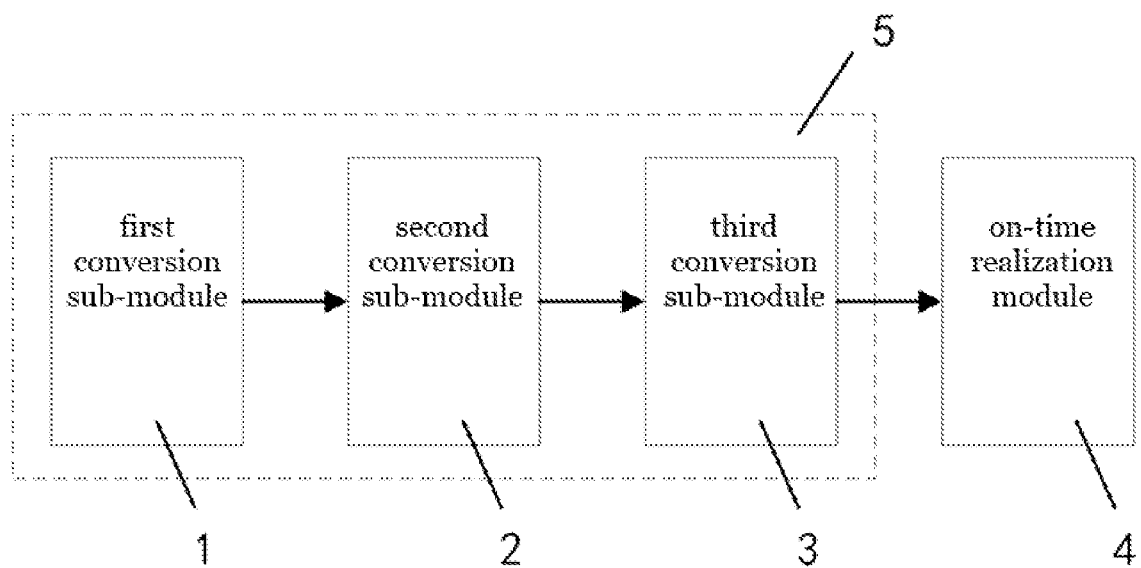
FIG. 1 is a schematic diagram showing the structure of an SMPS control circuit according to an embodiment of the present invention.

In these figures, 1 denotes a first conversion sub-module; 2, a second conversion sub-module; 3, a third conversion sub-module; 4, an on-time realization module; 5, a signal conversion module;

21, a first voltage signal node; 22, a second voltage signal node; 41, a voltage-to-current conversion sub-module; 42, a discharge sub-module; 43, a comparative voltage output sub-module; and 44, a power transistor driving sub-module.

DETAILED DESCRIPTION

Objectives, advantages and features of the present invention will become more apparent upon reading the following more detailed description of the present invention with reference to the accompanying drawings. Note that the figures are provided in a very simplified form not necessarily drawn to exact scale and for the only purpose of facilitating easy and clear description of the embodiments. In addition, the structures shown in the figures are usually part of actual structures. In particular, as the figures tend to have distinct emphases, they are often drawn to different scales.

As used herein, the singular forms "a", "an" and "the" include plural referents. The term "or" is generally employed in the sense of "and/or", "several" of "at least one", and "at least two" of "two or more". Additionally, the use of the terms "first", "second" and "third" herein is intended for illustration only and is not to be construed as denoting or implying relative importance or as implicitly indicating the numerical number of the referenced item. Accordingly, defining an item with "first", "second" or "third" is an explicit or implicit indication of the presence of one or at least two of the items. The terms "one end" and "the other end", as well as "proximal end" and "distal end", are generally used to refer to opposing end portions including the opposing endpoints, rather than only to the endpoints. The terms "mounting", "coupling" and "connection" should be interpreted in a broad sense. For example, a connection may be a permanent, detachable or integral connection, a direct or indirect connection with one or more intervening media, or an internal communication or interaction between two elements. As used herein, when an element is referred to as being "disposed on" another element, this is generally intended to only mean that there is a connection, coupling, engagement or transmission relationship between the two elements, which may be either direct or indirect with one or more intervening elements, and should not be interpreted as indicating or implying a particular spatial position relationship between the two elements, i.e., the element may be located inside, outside, above, under, beside, or at any other location relative to the other element, unless the context clearly dictates otherwise. Those of ordinary skill in the art can understand the specific meanings of the above-mentioned terms herein, depending on their context.

In principle, the present invention seeks to provide a switched-mode power supply (SMPS) including a signal conversion module and an on-time realization module.

Figure 2:
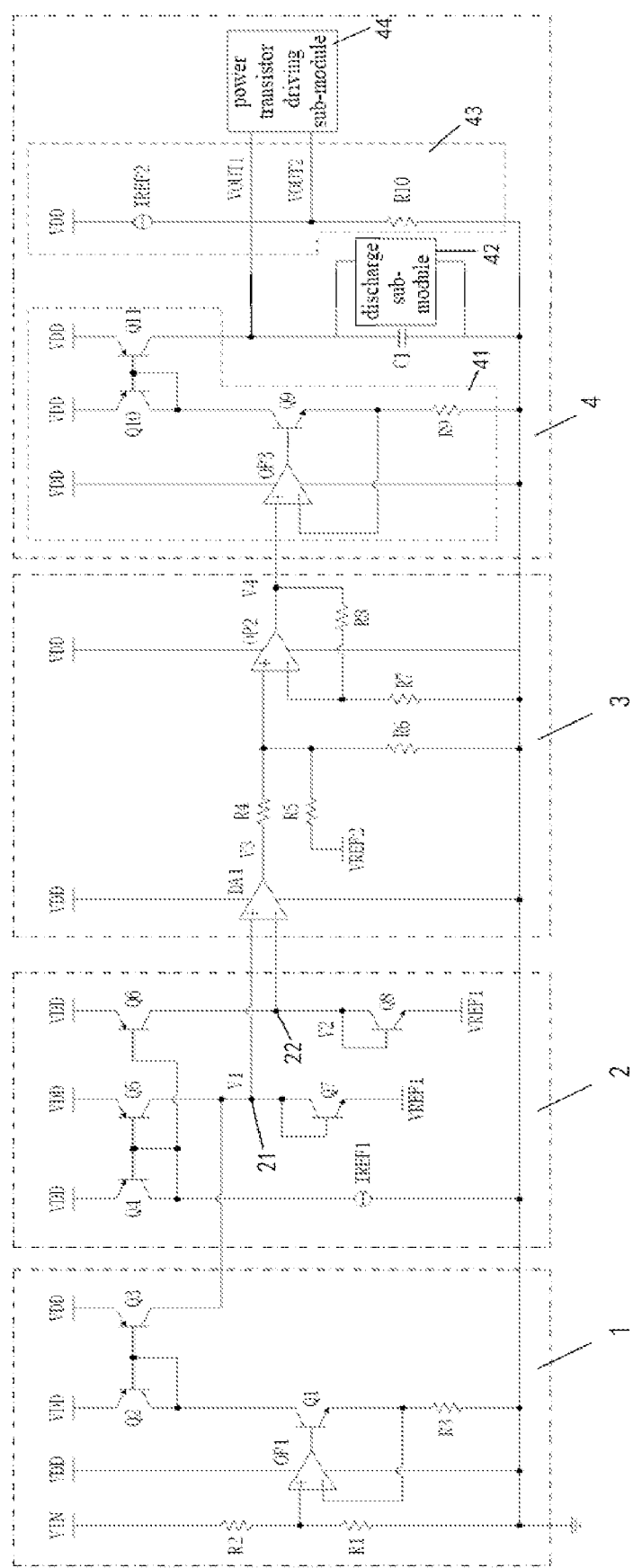
FIG. 2 shows a circuit diagram of an SMPS control circuit according to an embodiment of the present invention.
Figure 3:
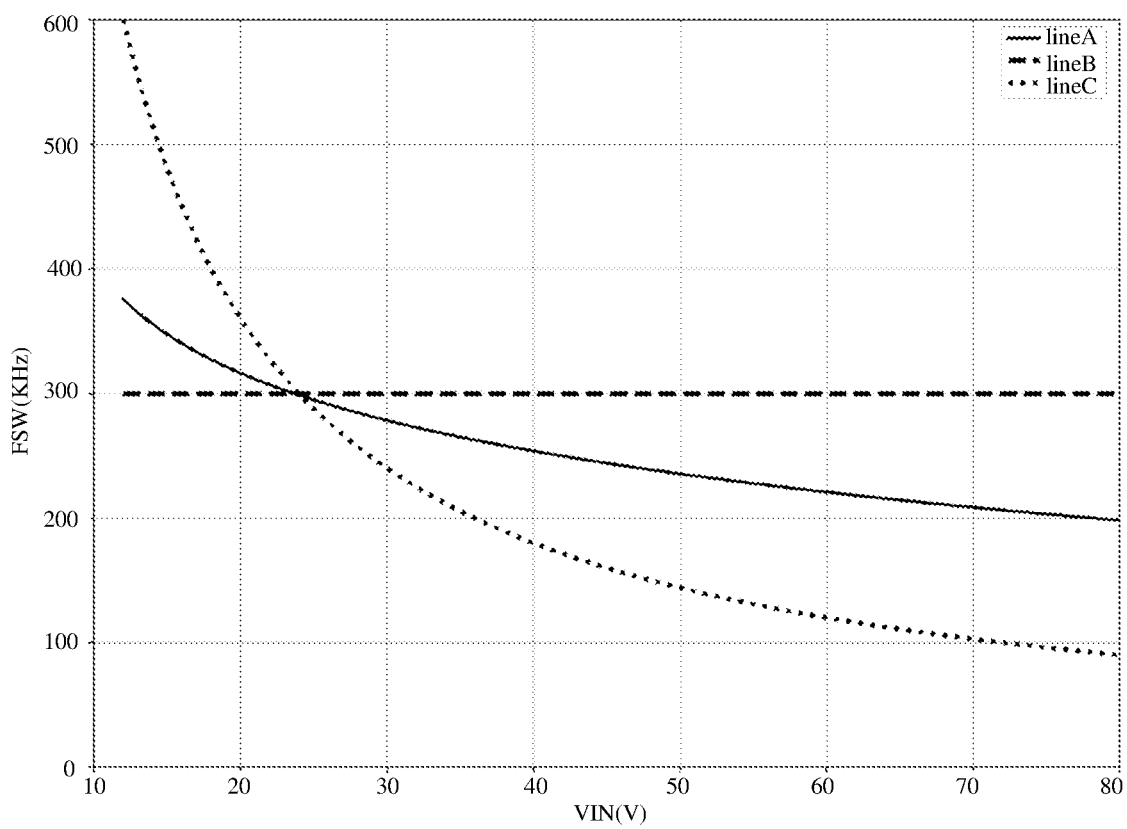
FIG. 3 shows a switching frequency profile of an SMPS control circuit according to an embodiment of the present invention.

Reference is made below to FIGS. 1 to 3. FIG. 1 is a schematic diagram showing the structure of an SMPS control circuit according to an embodiment of the present invention. FIG. 2 shows a circuit diagram of an SMPS control circuit according to an embodiment of the present invention. FIG. 3 shows a switching frequency profile of an SMPS control circuit according to an embodiment of the present invention.

An on-time of a power transistor in a buck circuit operating in a continuous current mode and its input and output voltages satisfy the following mathematical relationship:

$$T_{ON} = \frac{VO}{VIN * FSW},$$

where VO is the output voltage of the buck circuit, VIN is the input voltage of the buck circuit, FSW is a switching frequency of the buck circuit, and $T_{ON}$ is the on-time.

This relationship can be converted to:

$$FSW = \frac{VO}{VIN * T_{ON}}.$$

As can be seen from this equation, the switching frequency varies as a function of $T_{ON}$. For example, when the on-time is kept constant, FSW is inversely proportional to VIN. Consequently, use in applications with a wide voltage range will be affected (essentially in terms of conductor configurations) at high VIN values. When $T_{ON}$ is made inversely proportional to VIN, FSW can be maintained constant. This will, however, lead to large losses at high voltages.

Based on the above analysis, the inventors believe that the functional relationship between $T_{ON}$ and VIN can affect the FSW profile and hence the operating performance of the entire buck circuit. The following embodiments are designed based on this recognition. It is to be stressed that, as used herein, "equal", "inversely proportional", "directly proportional" and similar expressions are all used in the context of engineering. For example, when two currents are described as being equal to each other, although it is obviously impossible for them to be "absolutely" equal due to manufacturing tolerances of associated components and mutual influence of components and traces in associated circuits, they are considered to be equal in the context of engineering as the performance of the circuits is not adversely affected by such possible differences between them.

As shown in FIG. 1, in one embodiment, there is provided an SMPS control circuit used in a buck circuit operating in a continuous current. The SMPS control circuit includes a signal conversion module 5 and an on-time realization module 4.

The signal conversion module 5 is configured to acquire an input voltage VIN and output a reference signal. When the input voltage VIN is invariable, the reference signal is a constant voltage or current signal. When the input voltage VIN is within an operating range, the reference signal will increase as the input voltage VIN increases, at a rate which decreases as the input voltage VIN increases. The on-time realization module 4 outputs a control signal based on the reference signal, which turns on a power transistor. Each time, the power transistor is turned on for a length of time in inverse proportion to the reference signal.

The output voltage of the buck circuit is affected by the turning on and off of the power transistor, but as this is substantially irrelevant to the essence of this application, further description thereof is omitted herein.

With this configuration, the frequency decreases as the input voltage increases, resulting in reductions in crossover loss and increases in system efficiency. At the same time, the frequency will not decrease too much to lead to excessive conductance being required, solving the problem associated with the prior art.

In consideration of the cost of implementing the circuit, and in order to allow the circuit to have additional functions, when the input voltage VIN is within the operating range, the reference signal and the input voltage satisfy the following functional relationship:

$$S = a(\text{Ln}(b*VIN + c) + d),$$

where S is the reference signal, VIN is the input voltage, Ln represents a natural logarithm operation, and a, b, c and d are constant coefficients determined by electrical parameters of components of the SMPS control circuit. It would be appreciated that a and b should be constants greater than 0, and c and d may be arbitrary values, whether positive, zero or negative, depending on the component parameters of the circuit. When c and d are preferred to be positive, as this allows a better on-time profile of the reference signal to be obtained.

In order to determine the SMPS control circuit, functional relationships of the electrical parameters of the circuit components in relation to a, b, c and d may be solved based on the common general knowledge in the art. In the following, a possible implementation of the circuit and a possible combination of values of a, b, c and d will be set forth.

With continued reference to FIG. 1, the signal conversion module 5 includes a first conversion sub-module 1, a second conversion sub-module 2 and a third conversion sub-module 3, which are coupled in sequence.

The first conversion sub-module 1 is configured to acquire the input voltage VIN and convert it into a first intermediate signal, the first intermediate signal is in direct proportion to the input voltage VIN.

The second conversion sub-module 2 is configured to acquire the first intermediate signal and convert it into a second intermediate signal, the second intermediate signal increases as the first intermediate signal increases, the increasing rate of the second intermediate signal decreases as the first intermediate signal increases.

The third conversion sub-module 3 is configured to acquire the second intermediate signal and to amplify and level-shift it into the reference signal.

With this configuration, the functions are allocated among the three sub-modules, reducing design cost and immunizing signals from crosstalk between the sub-modules. Ultimately, the output reference signal is stable, making the entire circuit to operate in a stable manner.

Referring to FIG. 2, the second conversion sub-module 2 includes a first voltage signal node 21 and a second voltage signal node 22. A voltage (V1) at the first voltage signal node 21 varies at the same rate as a voltage (V2) at the second voltage signal node 22 with temperature, and the second intermediate signal is obtained by subtracting the voltage at the second voltage signal node 22 from that at the first voltage signal node 21.

With this configuration, the impact of temperature variation on the ultimate on-time of the power transistor can be eliminated or mitigated.

Referring to FIG. 2, in one embodiment, the first conversion sub-module 1 includes a first resistor R1, a second resistor R2, a third resistor R3, a first operational amplifier OP1, a first transistor Q1, a second transistor Q2 and a third transistor Q3.

A first terminal of the first resistor R1 is grounded.

A first terminal of the second resistor R2 is coupled to a second terminal of the first resistor R1, and a second terminal of the second resistor R2 is configured to acquire the input voltage VIN.

A non-converting terminal of the first operational amplifier OP1 is coupled to the second terminal of the first resistor R1, and a positive power supply terminal of the first operational amplifier OP1 is coupled to a power supply VDD. A negative power supply terminal of the first operational amplifier OP1 is grounded.

The first transistor Q1 is an NPN transistor. A base of the first transistor Q1 is coupled to an output terminal of the first operational amplifier OP1. An emitter of the first transistor Q1 is coupled to a converting terminal of the first operational amplifier OP1. The emitter of the first transistor Q1 is also grounded through the third resistor R3.

The second transistor Q2 is a PNP transistor. An emitter of the second transistor Q2 is coupled to the power supply VDD. A collector of the second transistor Q2 is coupled to a collector of the first transistor Q1. A base of the second transistor Q2 is coupled to its own collector.

The third transistor Q3 is a PNP transistor. An emitter of the third transistor Q3 is coupled to the power supply VDD. A base of the third transistor Q3 is coupled to the base of the second transistor Q2. A collector of the third transistor Q3 is configured to output the first intermediate signal. The first intermediate signal is a current signal. That is, the first intermediate signal is a collector current of the third transistor Q3.

For OP1, due to the presence of negative feedback, a current IR3 through R3 is expressed as:

$$IR3 = VIN * \frac{R1}{R1+R2} * \frac{1}{R3}.$$

If currents of through the transistors are amplified a sufficient number of times, their base currents can be ignored. From analysis based on FIG. 2, we can obtain:

$$IQ2=IQ1=IR3,$$

where IQ1 is a current through Q1 (its base current has been ignored). Likewise, IQ2 is a current through Q2, and IQ3 is a current through Q3.

Q3 and Q2 constitute a 1:1 current mirror. That is, a ratio of IS currents of the two transistors is 1:1. In other words, an emitter area ratio of the two transistors is 1:1. The two transistors can be considered to be exactly identical. The IS currents refer to the transistors' reverse saturation currents, which can be estimated as $10^{-17}$ A at normal atmospheric temperature. IS and transistor selection occurs both in relation to temperature.

Therefore, we obtain IQ3=IQ2.

Finally, the current IQ3 can be expressed as:

$$IQ3 = VIN * \frac{R1}{R1+R2} * \frac{1}{R3}.$$

As can be seen, IQ3 and VIN are directly proportional to each other, in line with the above description.

The second conversion sub-module 2 includes a reference current source, a fourth transistor Q4, a fifth transistor Q5, a sixth transistor Q6, a seventh transistor Q7 and an eighth transistor Q8.

The fourth transistor Q4 is a PNP transistor. An emitter of the fourth transistor Q4 is coupled to the power supply VDD. A base of the fourth transistor Q4 is coupled to its own collector. A collector of the fourth transistor Q4 is coupled to a positive terminal of the reference current source. A negative terminal of the reference current source is grounded.

The fifth transistor Q5 is a PNP transistor. An emitter of the fifth transistor Q5 is coupled to the power supply VDD. A base of the fifth transistor Q5 is coupled to the base of the fourth transistor Q4. A collector of the fifth transistor Q5 is configured to acquire the first intermediate signal. The first intermediate signal is a current signal.

The sixth transistor Q6 is a PNP transistor. An emitter of the sixth transistor Q6 is coupled to the power supply VDD. A base of the sixth transistor Q6 is coupled to the base of the fourth transistor Q4.

The seventh transistor Q7 is an NPN transistor. A collector of the seventh transistor Q7 is coupled to the collector of the fifth transistor Q5. The collector of the seventh transistor Q7 is coupled to its own base. An emitter of the seventh transistor Q7 is configured to acquire a first reference voltage VREF1. The collector of the seventh transistor Q7 is also configured to output a first voltage V1.

The eighth transistor Q8 is an NPN transistor. A collector of the eighth transistor Q8 is coupled to a collector of the sixth transistor Q6. The collector of the eighth transistor Q8 is coupled to its own base. An emitter of the eighth transistor Q8 is configured to acquire the first reference voltage VREF1. The collector of the eighth transistor Q8 is also configured to output a second voltage V2. The first reference voltage VREF1 and the reference current source may be configured based on the common general knowledge in the art, and further description thereof is omitted herein.

The second intermediate signal is obtained as the difference between the first voltage V1 and the second voltage V2.

The transistors Q4, Q5, Q6 constitute a current mirror with an IS ratio of 1:1:1. The reference current source provides a current IREF1 typically ranging from 1 µA to 10 µA. Q7 and Q8 are identical transistors. The first reference voltage is denoted as VREF1.

Based on the above parameters and wiring of the components, we can obtain: IREF1=IQ4=IQ5=IQ6, where IQ4 is a current through Q4, IQ5 is a current through Q5, and IQ6 is a current through Q6.

A current IQ7 through Q7 is given by IQ7=IQ3+IQ5=IQ3+IREF1.

A current IQ8 through Q8 is given by IQ8=IQ6=IREF1.

Therefore, the difference between V1 and V2 satisfies V1−V2=VQ7−VQ8.

A collector-emitter voltage of Q7 is denoted as VQ7, and a collector-emitter voltage of Q8 is denoted as VQ8.

VQ7 satisfies:

$$VQ7 = V_T * \text{Ln}\left(\frac{IQ7}{IS}\right) = V_T * \text{Ln}\left(\frac{IQ3 + IREF1}{IS}\right)$$

VQ8 satisfies $$VQ8 = V_T * \text{Ln}\left(\frac{IQ8}{IS}\right) = V_T * \text{Ln}\left(\frac{IREF1}{IS}\right)$$

From the above equations, we obtain:

$$V1 - V2 = V_T * \text{Ln}\left(\frac{IQ3 + IREF1}{IREF1}\right)$$

where $V_T$ represents a thermal voltage, which is approximately 26 mV at normal atmospheric temperature.

As can be seen from the above equations, although the IS term varies significantly with temperature, it is eventually cancelled in the final equation. Equivalently, it provides a function of temperature compensation.

VREF1 is also absent from the equation. VREF1 is intended to provide an appropriate bias for the next stage and ensure that the emitters of VQ7 and VQ8 are at the same potential.

The third conversion sub-module 3 includes a differential amplifier DA1, a fourth resistor R4, a fifth resistor R5, a sixth resistor R6, a seventh resistor R7, an eighth resistor R8 and a second operational amplifier OP2.

Non-converting and converting terminals of the differential amplifier DA1 are configured to cooperate to enable the acquisition of the second intermediate signal. A positive power supply terminal of the differential amplifier DA1 is coupled to the power supply VDD, and a negative power supply terminal of the differential amplifier is grounded.

A first terminal of the fourth resistor R4 is coupled to an output terminal of the differential amplifier DA1, and a second terminal of the fourth resistor R4 is coupled to a non-converting terminal of the second operational amplifier OP2.

A first terminal of the fifth resistor R5 is coupled to the second terminal of the fourth resistor R4. A second terminal of the fifth resistor R5 is configured to acquire a second reference voltage VREF2. The second reference voltage VREF2 may be configured based on the common general knowledge in the art, and further description thereof is omitted herein.

A first terminal of the sixth resistor R6 is coupled to the second terminal of the fourth resistor R4, and a second terminal of the sixth resistor R6 is grounded.

A first terminal of the seventh resistor R7 is coupled to a converting terminal of the second operational amplifier OP2, and a second terminal of the seventh resistor R7 is grounded.

A first terminal of the eighth resistor R8 is coupled to an output terminal of the second operational amplifier OP2. A second terminal of the eighth resistor R8 is coupled to the first terminal of the seventh resistor R7.

A positive power supply terminal of the second operational amplifier OP2 is coupled to the power supply VDD. A negative power supply terminal of the second operational amplifier OP2 is grounded. The output terminal of the second operational amplifier OP2 is configured to output the reference signal. In this embodiment, the reference signal is output as an output voltage V4 of the second operational amplifier OP2.

In one embodiment, the fourth resistor R4, the fifth resistor R5 and the sixth resistor R6 have equal resistance. Resistance of the parallel-connected seventh resistor R7 and eighth resistor R8 is equal to the resistance of the fourth resistor R4. It would be appreciated that, in other embodiments, the design benefits taught herein can be still achieved when different resistance configurations are employed, and it is intended that these are also embraced within the scope of the present invention.

An output voltage V3 of DA1 is expressed as: V3=(V1−V2)*A1, where A1 is the number of times DA1 is amplified.

As R4=R5=R6=R7∥R8 ("∥" denotes a parallel connection), an output voltage V4 of OP2 can be expressed as:

$$V4 = \frac{R8}{R4} * (V3 + VREF2)$$

As can be seen from this equation, the voltage V4 is a superimposition of the voltage difference V1-V2 with VREF2.

V4, i.e., the reference signal, and VIN satisfy the following functional relationship:

$$V4 = \frac{R8}{R4} * \left( V_T * \mathrm{Ln}\left( \frac{VIN * \frac{R1}{R1+R2} * \frac{1}{R3} + IREF1}{IREF1} \right) * A1 + VREF2 \right)$$

This is equivalent to:

$$V4 = \frac{R8}{R4} * V_T * A1 * \mathrm{Ln}\left( VIN * \frac{\frac{R1}{R1+R2} * \frac{1}{R3}}{IREF1} + 1 \right) + \frac{R8}{R4} * VREF2$$

In other words, in S=a(Ln(b*VIN+c)+d), a=R8/R4*$V_T$*A1, b=R1/(R1+R2)/R3/IREF1, c=1, and d=R8*VREF2/R4.

In one embodiment, the reference signal is a voltage signal (i.e., V4), and the on-time realization module 4 includes a voltage-to-current conversion sub-module 41, a capacitor C1, a discharge sub-module 42, a comparative voltage output sub-module 43 and a power transistor driving sub-module 44.

The voltage-to-current conversion sub-module 41 is configured to acquire the reference signal and convert it into a constant charge current directly proportional to the reference signal.

The charge current is used to charge the capacitor C1.

The discharge sub-module 42 is configured to acquire a discharge signal and responsively discharge the capacitor C1, pulling a voltage across the capacitor C1 down to 0 V within a single on-period of the discharge signal and keeping it at 0 V. Here, "0 V" should be also construed in the context of engineering. The predetermined on-period may be configured by a signal from an external circuit. The discharge sub-module 42 may be particularly configured as required, and further description thereof is omitted herein. The discharge signal may be produced during an off-period of the power transistor. The single on-period of the discharge signal may be determined by an external configuration signal, or the discharge signal may be from an external circuit. The single on-period of the discharge signal is equal to a single expected off-time of the power transistor, which can be calculated according to $T_{total}-T_{on}$, where $T_{total}$ is a length of time of one full period and can be calculated according to VIN*$T_{on}$/VO. The external circuit may produce the discharge signal or the signal for configuring it using predefined logic.

The comparative voltage output sub-module 43 is configured to output a comparative voltage VOUT2. Separately providing the comparative voltage output sub-module 43 can facilitate COT (more precisely, basis COT) adjustment of the SMPS control circuit through external parameter tuning. When the input voltage VIN changes, the COT of the SMPS control circuit may shift from the basic COT according to predefined logic.

The power transistor driving sub-module 44 is configured to compare a voltage VOUT1 across the capacitor C1 within a single off-period of the discharge signal with the comparative voltage VOUT2. If the voltage VOUT1 across the capacitor C1 is lower than the comparative voltage VOUT2, the power transistor is turned on. If the voltage VOUT1 across the capacitor C1 is higher than the comparative voltage VOUT2, the power transistor is turned off. The power transistor driving sub-module 44 may be configured as required, and further description thereof is omitted herein.

The power transistor driving sub-module 44 is also configured to turn off the power transistor within a single on-period of the discharge signal. In one specific implementation, the power transistor may be maintained in an off-state under the action of a control signal output from the power transistor driving sub-module 44. In an alternative implementation, during a single on-period of the discharge signal, an external circuit may shield a control signal output from the power transistor driving sub-module 44*o* and allow a signal for keeping the power transistor OFF to perform its function.

On the basis of the above description, operation of the on-time realization module 4 in each full cycle starts with deactivation of the discharge signal. At this point, the voltage VOUT1 across the capacitor C1 is 0 V, and the power transistor driving sub-module 44 turns on the power transistor. As a result, the capacitor C1 is charged with the charge current, causing a gradual rise of the voltage VOUT1 across the capacitor C1. Upon the voltage VOUT1 across the capacitor C1 exceeding the comparative voltage VOUT2, the power transistor driving sub-module 44 turns off the power transistor. At the same time as the power transistor is turned off, the discharge signal is activated, and during a period of time in which the discharge signal is maintained active, the power transistor remains inactive regardless of whether VOUT1 is higher than VOUT2 or not. Within this period, the VOUT1 across the capacitor C1 drops to, and remains at, 0 V. The on-period of the discharge signal may be calculated and realized by an external circuit, and the discharge signal is deactivated after the on-period elapses until the next cycle begins.

Although V4 has been taken as the reference signal in the embodiments disclosed herein, it would be appreciated that the various modules and signals are arbitrarily defined, and it is also possible to take the charge current as the reference signal. Depending on such arbitrary definitions, the reference signal may be taken as a constant voltage or current signal.

Referring to FIG. 2, the voltage-to-current conversion sub-module 41 includes a third operational amplifier OP3, a ninth transistor Q9, a tenth transistor Q10, an eleventh transistor Q11 and a ninth resistor R9. The comparative voltage output sub-module 43 includes a reference current source and a tenth resistor R10. The reference current source may be configured based on the common general knowledge in the art, and further description thereof is omitted herein.

A non-converting terminal of the third operational amplifier OP3 is configured to acquire the reference signal V4. A positive power supply terminal of the third operational amplifier OP3 is coupled to the power supply VDD. A negative power supply terminal of third operational amplifier OP3 is grounded.

The ninth transistor Q9 is an NPN transistor. A base of the ninth transistor Q9 is coupled to an output terminal of the third operational amplifier OP3. An emitter of the ninth transistor Q9 is coupled to a converting terminal of the third operational amplifier OP3. The emitter of the ninth transistor Q9 is also grounded through the ninth resistor R9.

The tenth transistor Q10 is a PNP transistor. An emitter of the tenth transistor Q10 is coupled to the power supply VDD. A base of the tenth transistor Q10 is coupled to its own collector. The collector of the tenth transistor Q10 is also coupled to a collector of the ninth transistor Q9.

The eleventh transistor Q11 is a PNP transistor. An emitter of the eleventh transistor Q11 is coupled to the power supply VDD. A base of the eleventh transistor Q11 is coupled to the base of the tenth transistor Q10. A collector of the eleventh transistor Q11 is coupled to a first terminal of the capacitor C1. A second terminal of the capacitor C1 is grounded. The collector of the eleventh transistor Q11 is configured to output the charge current.

A positive terminal of the reference current source is coupled to the power supply VDD, and a negative terminal of the reference current source is grounded through the tenth resistor R10. The negative terminal of the reference current source is configured to output the comparative voltage VOUT2.

The discharge sub-module 42 and the power transistor driving sub-module 44 may be wired as shown in FIG. 2. In other embodiments, these sub-modules may be otherwise wired as is technically permissible.

According to the above wiring scheme, OP3, Q9 and R9 make up a voltage-to-current converter, and the transistors Q10 and Q11 constitute a 1:1 current mirror for charging C1. If an initial value of the voltage across C1 is 0 V, then a relationship between the voltage VOUT1 and the time t can be expressed as:

$$VOUT1 = (V4*t)/(R9*C1).$$

IREF2 denotes a current provided by the reference current source, which typically ranges from 1 µA to 10 µA. Accordingly, the voltage VOUT2 can be expressed as:

$$VOUT2 = IREF2*R10.$$

The time period in which the power transistor is kept active after it is turned on by the power transistor driving sub-module 44 upon VOUT1 dropping below VOUT2 is given by:

$$T_{ON} = (IREF2*R10*R9*C1)/V4.$$

Finally, FSW can be calculated according to:

$$FSW = \frac{VO}{VIN} * \frac{\frac{R8}{R4} * \left(V_T * \text{Ln}\left(\frac{VIN * \frac{R1}{R1+R2} * \frac{1}{R3} + IREF1}{IREF1}\right) * A1 + VREF2\right)}{IREF2*R10*R9*C1}$$

An appropriate value of the switching frequency FSW can be obtained from proper parameter settings. FIG. 3 shows a comparison between variation of FSW as a function of the input voltage in the above-discussed circuit and that obtained by conventional methods.

In FIG. 3, line A represents variation of the switching frequency as a function of the input voltage according to the present embodiment. As can be seen from the figure, within 40 V, FSW is substantially around 300 kHz (showing better performance than that of line C). FSW gradually decreases as the input voltage rises, resulting in reductions in crossover loss (showing better performance than that of line B).

In the figure, line B represents a frequency profile of a constant-frequency scheme, in which the frequency does not vary with the input voltage (i.e., the on-time $T_{ON}$ is inversely proportional to the input voltage VIN). However, this scheme exhibits slightly greater crossover losses at high voltages.

In the figure, line C represents a frequency profile of a scheme with completely fixed $T_{ON}$ (i.e., the on-time $T_{ON}$ does not vary with the input voltage VIN). This scheme shows significant FSW variation, creating design difficulties and making it unsuitable for use in applications with a wide voltage range.

As shown in FIG. 3, within the operating range, the present embodiment provides better performance than both the constant-frequency and completely fixed $T_{ON}$ schemes.

In embodiments of the present invention, there is also provided a power chip comprising the SMPS control circuit as defined above. For details of the power chip, reference can be made to the foregoing description of this specification. The power chip also provides a better on-time vs. input voltage functional relationship than the prior art.

In summary, embodiments of the present invention provide an SMPS control circuit and a power chip. The SMPS control circuit includes a signal conversion module 5 and an on-time realization module 4. The signal conversion module 5 is configured to acquire an input voltage VIN and output a reference signal. The reference signal increases as the input voltage VIN increases, at a rate decreasing as the input voltage VIN increases. The on-time realization module 4 is based on the reference signal to output a control signal for turning on a power transistor and maintaining it on for a period of time in inverse proportion to the reference signal. With this configuration, the SMPS control circuit operates in a COT mode combining advantages of both a complete COT mode and a mode with an on-time in inverse proportion to the input voltage in a high-voltage range, overcoming the problem with conventional power supply circuits of being configured with an on-time vs. input voltage functional relationship in a COT mode, which is suboptimal and problematic under some operating conditions.

It should be understood that the description presented above is merely that of a few preferred embodiments of the present invention and is not intended to limit the scope thereof in any sense. Any and all changes and modifications made by those of ordinary skill in the art based on the above teachings fall within the scope of the invention.

What is claimed is:

1. A switched-mode power supply (SMPS) control circuit, comprising a signal conversion module and an on-time realization module,
   the signal conversion module configured to acquire an input voltage and output a reference signal, wherein the reference signal is a constant voltage signal when the input voltage is constant and the reference signal increases as the input voltage increases when the input voltage is within an operating range, an increasing rate of the reference signal decreasing as the input voltage increases,
   the on-time realization module based on the reference signal to output a control signal, thereby turning on the power transistor, the power transistor is turned on over a period of time in inverse proportion to the reference signal, the on-time realization module comprising a voltage-to-current conversion sub-module, a capacitor, a discharge sub-module, a comparative voltage output sub-module and a power transistor driving sub-module, the voltage-to-current conversion sub-module configured to acquire the reference signal and convert the reference signal into a constant charge current, wherein the charge current is in direct proportion to the reference signal, the charge current configured to charge the capacitor;

the discharge sub-module configured to acquire a discharge signal and discharge the capacitor so that a voltage across the capacitor drops to, and remains at, 0 V within a single on- period of the discharge signal, the discharge signal produced in response to turning-off of the power transistor, the single on-period of the discharge signal determined by an external configuration signal or input from an external circuit, the comparative voltage output sub-module configured to output a comparative voltage, the power transistor driving sub-module configured to compare the voltage across the capacitor with the comparative voltage within a single off-period of the discharge signal and turn on the power transistor if the voltage across the capacitor is lower than the comparative voltage, or turn off the power transistor if the voltage across the capacitor is higher than the comparative voltage, the power transistor driving sub-module also configured to turn off the power transistor within the single on-period of the discharge signal.

2. The SMPS control circuit according to claim 1, wherein when the input voltage is within the operating range, the reference signal and the input voltage satisfy the following functional relationship:

$$S=a(\text{Ln}(b*\text{VIN}+c)+d),$$

where S represents the reference signal, VIN represents the input voltage, Ln represents a natural logarithm operation, and a, b, c and d are constant coefficients determined by electrical parameters of components of the SMPS control circuit.

3. The SMPS control circuit according to claim 1, wherein the signal conversion module comprises a first conversion sub-module, a second conversion sub-module and a third conversion sub-module, which are connected in sequence, the first conversion sub-module configured to acquire the input voltage and convert the input voltage into a first intermediate signal, wherein the first intermediate signal is in direct proportion to the input voltage, the second conversion sub-module configured to acquire the first intermediate signal and convert the first intermediate signal into a second intermediate signal, the second intermediate signal increases as the first intermediate signal increases, an increasing rate of the second intermediate signal decreases as the first intermediate signal increases, the third conversion sub-module configured to acquire the second intermediate signal and produce the reference signal by amplifying and level-shifting the second intermediate signal.

4. The SMPS control circuit according to claim 3, wherein the second conversion sub-module comprises a first voltage signal node and a second voltage signal node, wherein a voltage at the first voltage signal node varies at a same rate with temperature as a voltage at the second voltage signal node, and wherein the second intermediate signal is obtained by subtracting the voltage at the second voltage signal node from the voltage at the first voltage signal node.

5. The SMPS control circuit according to claim 3, wherein the first conversion sub-module comprises a first resistor, a second resistor, a third resistor, a first operational amplifier, a first transistor, a second transistor and a third transistor, a first terminal of the first resistor being grounded, a first terminal of the second resistor connected to a second terminal of the first resistor, a second terminal of the second resistor configured to acquire the input voltage, a non-converting terminal of the first operational amplifier connected to the second terminal of the first resistor, a positive power supply terminal of the first operational amplifier connected to a power supply, a negative power supply terminal of the first operational amplifier being grounded, the first transistor implemented as an NPN transistor, a base of the first transistor connected to an output terminal of the first operational amplifier, an emitter of the first transistor connected to a converting terminal of the first operational amplifier, the emitter of the first transistor also grounded through the third resistor, the second transistor implemented as a PNP transistor, an emitter of the second transistor connected to the power supply, a collector of the second transistor connected to a collector of the first transistor, a base of the second transistor connected to a collector of the second transistor, the third transistor implemented as a PNP transistor, an emitter of the third transistor connected to the power supply, a base of the third transistor connected to the base of the second transistor, a collector of the third transistor configured to output the first intermediate signal which is a current signal.

6. The SMPS control circuit according to claim 3, wherein the second conversion sub-module comprises a reference current source, a fourth transistor, a fifth transistor, a sixth transistor, a seventh transistor and an eighth transistor, the fourth transistor implemented as a PNP transistor, an emitter of the fourth transistor connected to a power supply, a base of the fourth transistor connected to a collector of the fourth transistor, the collector of the fourth transistor connected to a positive terminal of the reference current source, a negative terminal of the reference current source being grounded, the fifth transistor implemented as a PNP transistor, an emitter of the fifth transistor connected to the power supply, a base of the fifth transistor connected to the base of the fourth transistor, a collector of the fifth transistor configured to acquire the first intermediate signal which is a current signal, the sixth transistor implemented as a PNP transistor, an emitter of the sixth transistor connected to the power supply, a base of the sixth transistor connected to the base of the fourth transistor, the seventh transistor implemented as an NPN transistor, a collector of the seventh transistor connected to the collector of the fifth transistor, the collector of the seventh transistor connected to a base of the seventh transistor, an emitter of the seventh transistor configured to acquire a first reference voltage, the collector of the seventh transistor also configured to output a first voltage, the eighth transistor implemented as an NPN transistor, a collector of the eighth transistor connected to a collector of the sixth transistor, the collector of the eighth transistor connected to a base of the eighth transistor, an emitter of the eighth transistor configured to acquire the first reference voltage, the collector of the eighth transistor also configured to output a second voltage,
wherein the second intermediate signal is the difference between the first voltage and the second voltage.

7. The SMPS control circuit according to claim 3, wherein the third conversion sub-module comprises a differential amplifier, a fourth resistor, a fifth resistor, a sixth resistor, a seventh resistor, an eighth resistor and a second operational amplifier,
  non-converting and converting terminals of the differential amplifier configured to cooperate with each other to acquire the second intermediate signal, a positive power supply terminal of the differential amplifier connected to a power supply, a negative power supply terminal of the differential amplifier being grounded,
  a first terminal of the fourth resistor connected to an output terminal of the differential amplifier, a second terminal of the fourth resistor connected to a non-converting terminal of the second operational amplifier,
  a first terminal of the fifth resistor connected to the second terminal of the fourth resistor, a second terminal of the fifth resistor configured to a second reference voltage,
  a first terminal of the sixth resistor connected to the second terminal of the fourth resistor, a second terminal of the sixth resistor being grounded,
  a first terminal of the seventh resistor connected to a converting terminal of the second operational amplifier, a second terminal of the seventh resistor being grounded,
  a first terminal of the eighth resistor connected to an output terminal of the second operational amplifier, a second terminal of the eighth resistor connected to the first terminal of the seventh resistor,
  a positive power supply terminal of the second operational amplifier connected to the power supply, a negative power supply terminal of the second operational amplifier being grounded, the output terminal of the second operational amplifier configured to output the reference signal.

8. The SMPS control circuit according to claim 7, wherein the fourth resistor, the fifth resistor and the sixth resistor have equal resistance and resistance of the parallel-connected seventh and eighth resistors is equal to the resistance of the fourth resistor.

9. The SMPS control circuit according to claim 1, wherein the voltage-to-current conversion sub-module comprises a third operational amplifier, a ninth transistor, a tenth transistor, an eleventh transistor and a ninth resistor,
  a non-converting terminal of the third operational amplifier configured to acquire the reference signal, a positive power supply terminal of the third operational amplifier connected to a power supply, a negative power supply terminal of the third operational amplifier being grounded,
  the ninth transistor implemented as an NPN transistor, a base of the ninth transistor connected to an output terminal of the third operational amplifier, an emitter of the ninth transistor connected to a converting terminal of the third operational amplifier, the emitter of the ninth transistor also grounded through the ninth resistor,
  the tenth transistor implemented as a PNP transistor, an emitter of the tenth transistor connected to the power supply, a base of the tenth transistor connected to a collector of the tenth transistor, the collector of the tenth transistor also connected to a collector of the ninth transistor,
  the eleventh transistor implemented as a PNP transistor, an emitter of the eleventh transistor connected to the power supply, a base of the eleventh transistor connected to the base of the tenth transistor, a collector of the eleventh transistor connected to a first terminal of the capacitor, a second terminal of the capacitor grounded, the collector of the eleventh transistor configured to output the charge current.

10. The SMPS control circuit according to claim 1, wherein the comparative voltage output sub-module comprises a reference current source and a tenth resistor,
  a positive terminal of the reference current source connected to a power supply, a negative terminal of the reference current source grounded through the tenth resistor, the negative terminal of the reference current source also configured to output the comparative voltage.

11. A power chip, comprising the switched-mode power supply (SMPS) control circuit of claim 1.

* * * * *